United States Patent [19]

Hoffacker et al.

[11] Patent Number: 4,984,751
[45] Date of Patent: Jan. 15, 1991

[54] SPOOL FOR STRIP-FORM RECORDING SUBSTRATES, IN PARTICULAR FOR PHOTOGRAPHIC FILMS

[75] Inventors: Franz Hoffacker, Langenfeld; Guido Kovacic, Unkel; Hermann Lührig, Leverkusen, all of Fed. Rep. of Germany

[73] Assignee: AGFA-Gevaert Aktiengessellschaft, Leverkusen, Fed. Rep. of Germany

[21] Appl. No.: 808,494

[22] Filed: Dec. 13, 1985

[30] Foreign Application Priority Data

Dec. 22, 1984 [DE] Fed. Rep. of Germany ....... 3447215

[51] Int. Cl.$^5$ ...................... G03B 19/04; B65H 75/28
[52] U.S. Cl. ........................................................ 242/74
[58] Field of Search ........................................... 242/74

[56] References Cited

U.S. PATENT DOCUMENTS

| | | | |
|---|---|---|---|
| 1,930,144 | 10/1933 | Lee | 242/74 |
| 2,477,010 | 7/1949 | Schmidt | 242/74 |
| 3,973,740 | 8/1976 | Schankler | 242/74 |
| 3,982,709 | 9/1976 | Hertel | 242/74 |
| 4,384,687 | 5/1983 | Lamoureux | 242/74 |
| 4,506,843 | 3/1985 | Lührig et al. | 242/74 |

FOREIGN PATENT DOCUMENTS

| | | | |
|---|---|---|---|
| 834693 | 5/1960 | United Kingdom | 242/74 |
| 1160110 | 7/1969 | United Kingdom | 242/74 |

Primary Examiner—Katherine Matecki
Attorney, Agent, or Firm—Connolly & Hutz

[57] ABSTRACT

A spool for strip-form recording substrates, in particular for photographic films, with a slit arranged in the spool core and means arranged therein for fixing the strip end inserted into the slit, and with transitional surfaces which are rounded in the approximate shape of a cylinder surface on the inlet side between the axially running upper and lower slit surfaces and the external surfaces of the spool core, which are arranged in kink-free manner between the adjacent surfaces of the spool core and each form an arc portion of more than 90° in cross section, the radius thereof being at least one third of the radius of the spool core.

4 Claims, 2 Drawing Sheets

SPOOL FOR STRIP-FORM RECORDING SUBSTRATES, IN PARTICULAR FOR PHOTOGRAPHIC FILMS

BACKGROUND OF THE INVENTION

The invention relates to a spool for strip-form recording substrates, in particular for photographic films, with a slit arranged in the spool core and means provided therein for fixing the end of the strip which is pushed into the slit, wherein transitional surfaces which are rounded approximately in the manner of a cylinder surface are provided at the inlet end between the axially running upper and lower slit faces and the external surfaces of the spool core.

A spool of this type is known from DE-AS 10 58 363. In the spool disclosed therein, however, the transitional surfaces adjoining the slit walls on the inlet side are curved very markedly and extend in cross-section only over an angular range of about 90° and kinks have to be accepted between these transitional surfaces and the external surfaces of the spool core.

This is revealed more clearly in the previously known embodiment according to US-PS 24 77 010, in which the angular range of the transitional surfaces is even smaller.

It has been found that films which have been wound onto film spools of this type frequently cannot withstand relatively high tensile stresses when being unwound again. On the other hand, however, films which, after image-wise exposure, are introduced by the user for unwinding and copying into processing devices designed for this purpose, are mechanically unwound after mechanically removing the roll of film including spool core from the film cassette in so-called presplicer devices and are stuck together to form long strips for the purpose of continuous processing, the beginning of the film being stuck to the end of a respective preceding film. To achieve high running speeds and thus for the economic use of the machinery involved in processing, the film is also unwound from the supply spool at high speed. As the end of the film is firmly hooked to the spool core, the film suddenly comes to a stand-still when being unwound from the spool at the end of the unwinding process which takes place at high speed. However, the end of the film should still not tear from the spool as it is to be automatically gripped in the presplicer device for the subsequent adhesion process and, after mechanical separation of the unexposed end portion of the film adhering to the spool, is to be supplied to the adhesion unit where it is connected to the beginning of the next film. The sudden stoppage of film travel at the end of the unwinding process just described leads to quite considerable dynamic tensile stresses to which the film is subjected with its end portion fixed on the spool. Moreover, in the previously known embodiments, the film is also strongly stressed statically at the end of the unwinding process in the camera and in the presplicer device because here the film does not come to rest on the inlet surfaces of the spool slit or at least comes to rest on an edge of the film slit. Although the film is supported here, the support is restricted to edge contact.

SUMMARY OF THE INVENTION

The object of the present invention is to provide a film spool during use of which the film withstands the above-mentioned dynamic tensile stresses and the static holding forces are increased. In the process, the film should be prevented not only from tearing out of the spool fixing but also from tearing in the end region of the film in front of the fixing position.

The spool design according to the invention prevents extreme curving or kinking of the film in the end region in contact with the spool core even after prolonged storage in the wound state which would reduce the dynamic tensile stress of the film in this region. This advantage can be achieved with the film spool according to the invention even if the film is wound up again by the user after imagewise exposure during its return into the film cassette in a direction opposed to the original winding direction. While the film is being unwound mechanically during processing, the film is supported on sudden stoppage of the unwinding process, in an extremely desirable manner by the film spool designed according to the invention, thus preventing the end of the film from being torn despite the high tensile stress. The static holding forces are also improved as the film experiences the flat contact on the transitional surfaces of the spool core at the end of an unwinding process in the camera or in the presplicer device even if the spool swings into an end position.

The spool according to the invention is advantageous in conjunction with photographic films but is also suitable for other recording substrates, for example for magnetic tape.

BRIEF DESCRIPTION OF THE DRAWINGS

An embodiment of the invention is described in more detail below with reference to the accompanying drawings.

DETAILED DESCRIPTION

The injection-moulded plastic film spool 1 has a substantially cylindrical spool core 2 with two lateral flanges 3 and 4.

Figure 1:
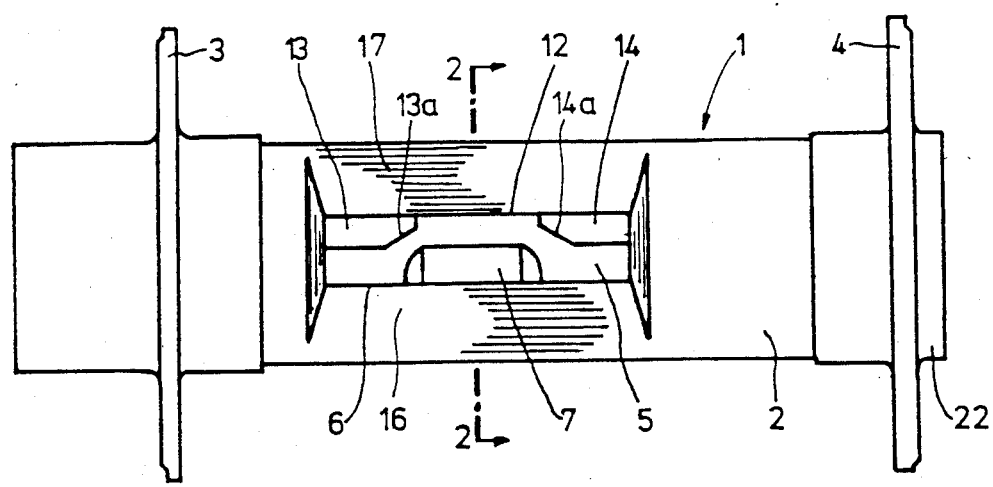
FIG. 1 shows a film spool according to the invention in an elevation with a view of the film inlet side.
Figure 2:
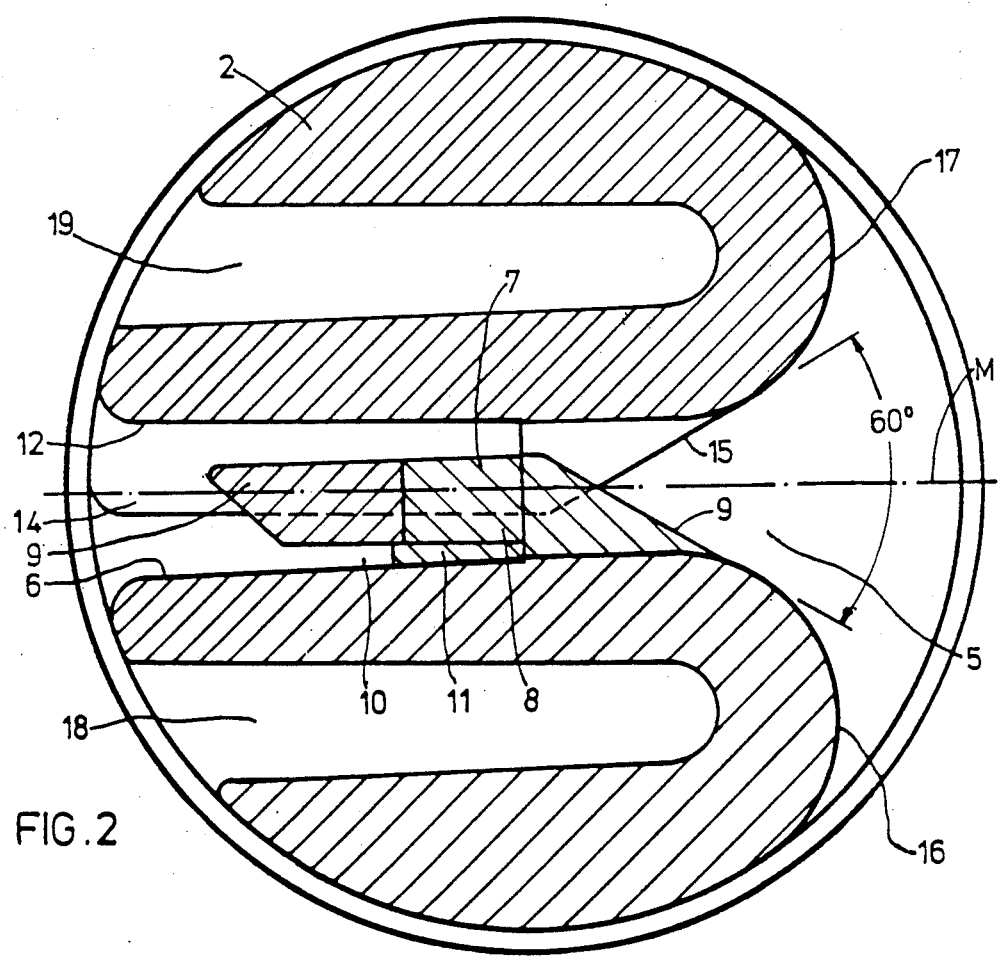
FIG. 2 shows the subject matter from FIG. 1 in a cross section along the line 2—2 (without flange)
Figure 3:
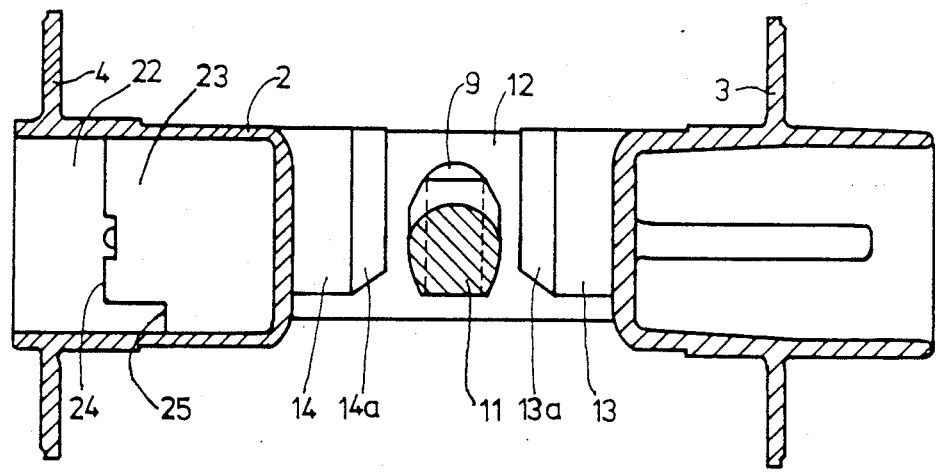
FIG. 3 shows the same film spool in a longitudinal section along the line 3—3 in FIG. 4.

In the spool core 2 there is located a slit 5 which runs axially through the core center and is used for inserting and fixing the end piece of a roll of photographic film (not shown), for example a miniature film, which is wound onto the film spool after being fixed, for which purpose the film end in FIG. 2 is introduced from the right into the spool slit 5 and, after fixing of the film in this slit, the film spool 1 shown in FIG. 2 is rotated in an anticlockwise direction.

The film hook 7 having a hook shaft 8 and a hook head 9 and serving to secure the film is moulded on the lower wall 6 of the spool slit 5. The hook shaft 8 has, on the film inlet side, a ramp 9 on which the film end to be inserted can slide during the insertion movement until it falls over the hook 7, after continuing the insertion movement, with a fixing hole designed as a slot and hooks in the space 10 between the hook head 9 and the slit wall 6 after slight withdrawal of the film. The foot 11 of the hook shaft 8 is adapted in known manner to the shape of the film slot so that the edges of the film can fit snugly in the slot on the hook foot 11.

Two-holding down clamps 13, 14 are moulded on the upper wall 12 of the slit 5 and, on the film insert side, also have ramps 15 which are tapered towards the hook head 9 (faces 13a, 14a). The holding-down clamps 13, 14 cause the lateral edges of the film end to be curved downwards during insertion into the slit 5 when the film end is pressed upwards in the longitudinal axis of the film as it slides onto the ramp 9 of the film hook 7. Once the film with its slot has fallen into the hook 7, the film becomes flat again owing to its inherent rigidity. The holding clamps 13, 14 then prevent the film with its slot from lifting out of the gripping hook 7 again.

The ramp 9 on the hook 7 as well as the ramps 15 on the holding down clamps 13, 14 allow the film end to be inserted smoothly into the slit 5 without the film being crushed in the process. For this purpose, the above-mentioned ramps are relatively flat in design. They enclose an angle of about 60° which is approximately symmetrical to the spool central plane M shown in FIG. 2.

FIG. 2 also shows that the recess 10 between hook head 9 and slit wall 6 in which the film hooks is arranged beneath the central plane of the spool, i.e. on the side via which winding occurs when loading the film. The internal width of the recess 10 only slightly exceeds the thickness of the film.

Several adjacent film hooks can obviously be provided instead of a single film hook 7 if the film end has a suitable number of slots.

Transitional surfaces 16, 17 adjoin the walls 6, 12 of the spool slit 5 and, in turn, pass into the external surfaces of the spool core 2. This prevents kinking in the direction of the slit surfaces 6, 12 and in the direction of the cylindrical external surfaces of the spool core 2. The transitional surfaces 16, 17 extend in the cross-section according to FIG. 2 over an angular range of about 135° and, within this range, form circular cylindrical surfaces having a radius which, in the embodiment according to FIG. 2, is about 0.38 times the radius of the cylindrical surfaces of the spool core 2.

This embodiment allows the transitional surfaces 16, 17 to attain the maximum radius without more or less sharply pronounced kinks or marked curves occurring adjacent to the slit surfaces 6, 12 or adjacent to the external contour of the spool core 2. Rather, the curvature is almost constant and as slight as possible in the transition from the flat slit walls 6, 12 to the cylindrical external surfaces of the spool core 2.

This enables the film to fit snugly either on the transitional surface 16 or on the transitional surface 17 when it is being wound, depending on the rotational direction of the spool 1, and to assume minimal curvature, as predetermined by the curvature of the transitional surface 16 or 17. The winding process should preferably be effected via the transitional surface 16. Although the film assumes this predetermined curvature in an irreversible manner after prolonged storage in the wound state, it is not so great that the tensile capacity is over-stressed during mechanical unwinding in the case of sudden stoppage of the film. In addition, owing to the arrangement of the hook 7 with its effective recess 10 beneath the central plane of the spool in this process, the film spool reaches an angular position at the end of the unwinding process under the influence of film tension in which position the film rests flatly on the transitional surface 16 acting as shoulder.

Figure 4:
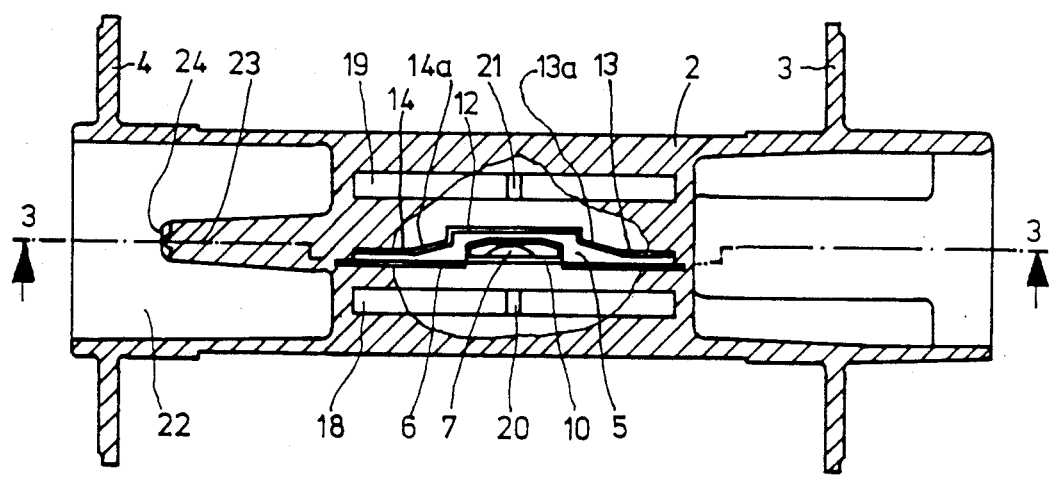
FIG. 4 shows the subject matter of FIG. 1 partly in section, partly in an elevation with a view of the side opposed to the film inlet side.

As shown in FIGS. 2 and 4, the film spool 1 has, between the spool slit 5 and the external-surfaces of the spool core 2, further slits 18, 19 whose opening lies externally opposing the film inlet side in order to economise in material and for ease of injection moulding. The slits 18, 19 also extend parallel to the central axis of the film spool and are divided in the center by transverse webs 20, 21. These transverse webs prevent lateral flanges 3 and 4 of a spool from hooking in the slits 18 and 19 of other spools during storage and during transportation of the empty film spools as loose bulk products prior to loading.

On the side of the spool flange 4, the spool core 2 is continued in a hub portion 22 in which a pick-up flange 23 is arranged. This flange can be gripped by film spool keys on the camera or device in order to drive the spool in the camera or in processing devices so that the driving movement is transmitted from the camera or loading or processing machine onto the film spool.

To enable the driving key on the camera or machine to be removed from the pick-up flange 23 easily again, the pick-up flange is trapezoidal in its longitudinal section, as shown in FIG. 4. The free edge 24 of the pick-up flange 23 has a recess 25 arranged at the end of the flange as an indicator for the angular positioning of the spool. Correct angular positioning of the film spool in the camera loading or processing machine can be achieved due to this eccentric arrangement which is unsymmetrical with respect to the spool axis if the driving key is correspondingly unsymmetrical, by making contact with the indicator. This is necessary, for example, for placing the slit opening on the inlet side right opposite the film transportation duct of the loading machine during mechanical insertion of the film end into the spool slit 5 of the film spool 1 for loading.

What is claimed:

1. A spool for receiving a strip of recording substrate comprising in combination a cylindrical core having a longitudinal slit parallel to the spool axis along a central plane of the core a pair of core parts formed by said longitudinal slit, one on each side of the central plane and the core parts having a pair of opposed slit surfaces positioned on opposite sides of the central plane and a pair of external surfaces positioned on opposite sides of the central plane, said core parts having open recesses on the side of the core parts diametric to the entry and formed between the slit and the external surfaces, means formed in said slit engageable with an end of a recording substrate inserted in said slit, said means comprising at least one hook positioned in said slit, having a shaft for engaging the substrate and a foot of the hook positioned in the slit on one of the core parts spaced outside of the central plane of the spool core, a pair of circular cylindrical transitional surfaces formed on the respective core parts situated at the respective side of the central plane each forming an arc portion of more than 90° and having a radius of curvature of at least one sixth of the diameter of the core and angularly spaced from each other to provide an entry for the recording substrate to the slit and the hook, and each circular cylindrical transitional surface connecting one of the slit surfaces with one of the external surfaces, so constructed and arranged that said transitional surfaces form a funnel-shaped entry to said slit for engagement of the recording substrate on the hook through the entry
with the hook foot juxtaposed with one of said transitional surfaces.

2. A spool according to claim 1, charactertised in that the recesses (18,19) are slit-shaped and run parallel to the longitudinal axis of the spool core (2).

3. A spool according to claim 2, characterised in that the slit-shaped recesses (18,19) have transverse webs (20,21).

4. A spool for receiving a strip of recording substrate comprising in combination
a cylindrical core having a longitudinal slit parallel to the spool axis along a central plane of the core
a pair of core parts formed by said longitudinal slit, one on each side of the central plane and the core parts having a pair of opposed slit surfaces positioned on opposite sides of the central plane and a pair of external surfaces positioned on opposite sides of the central plane,
said core parts having open recesses on the side of the core parts diametric to the entry and formed between the slit and the external surfaces,
means formed in said slit engageable with an end of a recording substrate inserted in said slit,
said means comprising at least one hook positioned in said slit, having a shaft for engaging the substrate and a foot of the hook positioned in the slit on one of the core parts spaced outside of the central plane of the spool core,
a pair of circular cylindrical transitional surfaces formed on the respective core parts situated at the respective side of the central plane each forming an arc portion of more than 90° and having a radius of curvature of at least one sixth of the diameter of the core and angularly spaced from each other to provide an entry for the recording substrate to the slit and the hook, and each circular cylindrical transitional surface connecting one of the slit surfaces with one of the external surfaces,
so constructed and arranged that said transitional surfaces form a funnel-shaped entry to said slit for engagement of the recording substrate on the hook through the entry
with the hook foot juxtaposed with one of said transitional surfaces, and
two holding down clamps formed in said slit on the slit surface of the core part on the other side of the central plane from the foot of the hook, laterally to the hook, which hold down the strip end after fixing it on the hook in the fixing position and have surfaces which are beveled towards the hook.

* * * * *